United States Patent
Michellone et al.

[11] 3,753,599
[45] Aug. 21, 1973

[54] PNEUMATIC ANTI-SKID VEHICLE BRAKING SYSTEM, HAVING TWO MODES OF OPERATION

[75] Inventors: Giancarlo Michellone, Cambiano, Turin; Marco Peruglia, Turin; Renzo Moretti, Cambiano, Turin, all of Italy

[73] Assignee: FIAT Societa per Azioni, Turin, Italy

[22] Filed: July 28, 1971

[21] Appl. No.: 166,846

[30] Foreign Application Priority Data
Dec. 30, 1970 Italy.............................. 71335 A/70

[52] U.S. Cl. ....... 303/21 F, 137/505.22, 188/181 R
[51] Int. Cl............................................. B60t 8/06
[58] Field of Search.................... 303/21 F, 61–63, 303/68–69, 10; 188/181 AU; 137/505.22

[56] References Cited
UNITED STATES PATENTS

| | | | |
|---|---|---|---|
| 2,059,808 | 11/1936 | Rubart et al.................. | 137/505.22 |
| 2,955,614 | 10/1960 | Meynig........................ | 137/505.22 |
| 3,425,751 | 2/1969 | Wehde et al. ................ | 303/21 F |
| 3,623,778 | 11/1971 | Horvath....................... | 303/21 F |
| 3,633,978 | 1/1972 | Remillieux................... | 303/21 F |
| 3,645,584 | 2/1972 | Leiber.......................... | 303/21 F |
| 3,667,816 | 6/1972 | Harned......................... | 303/21 F |

Primary Examiner—Milton Buchler
Assistant Examiner—D. C. Butler
Attorney—Richard C. Sughrue, Robert V. Sloan et al.

[57] ABSTRACT

An anti-skid braking system having two separate modes of operation depending on the road conditions is disclosed. In this system there is a device sensitive to the braking pressure which is required to cause the wheels to skid which operates to modify the operation of the device which releases the braking pressure so that if the braking pressure is below a certain threshold value (indicating that the surface is slippery) the braking pressure is released substantially instantaneously whereas if the braking pressure is above the threshold value (indicating that the road surface is dry and holding well) the braking pressure is initially only parially released rapidly, thereafter being released gradually until it has fallen below the threshold value whereupon it is again substantially instantaneously released down to atmospheric pressure, so that on dry surfaces the pressure is not completely released when skidding is imminent to avoid any jerkiness that would be deleterious to the road holding.

6 Claims, 7 Drawing Figures

Patented Aug. 21, 1973
3,753,599
3 Sheets-Sheet 1
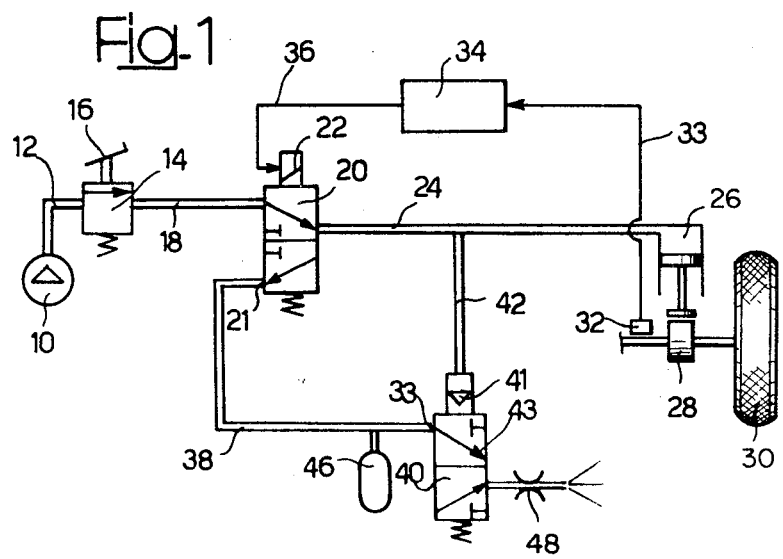
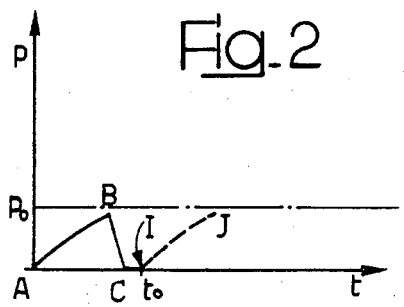
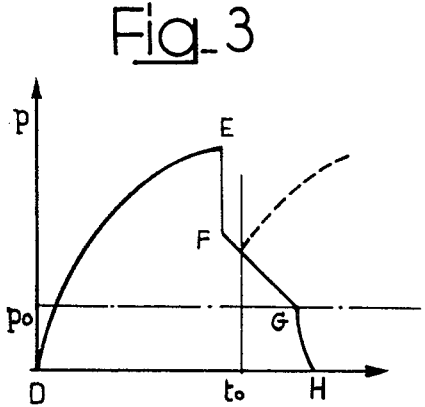
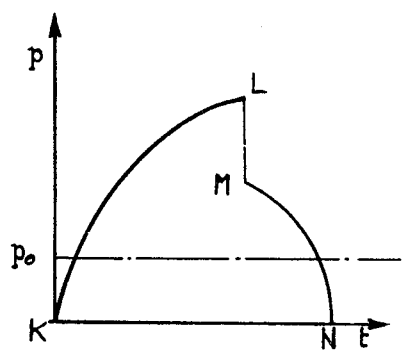
INVENTORS
GIANCARLO MICHELLONE
MARCO PERUGLIA
RENZO MORETTI
BY Sughrue, Rothwell, Mion, Zinn & Macpeak
ATTORNEYS

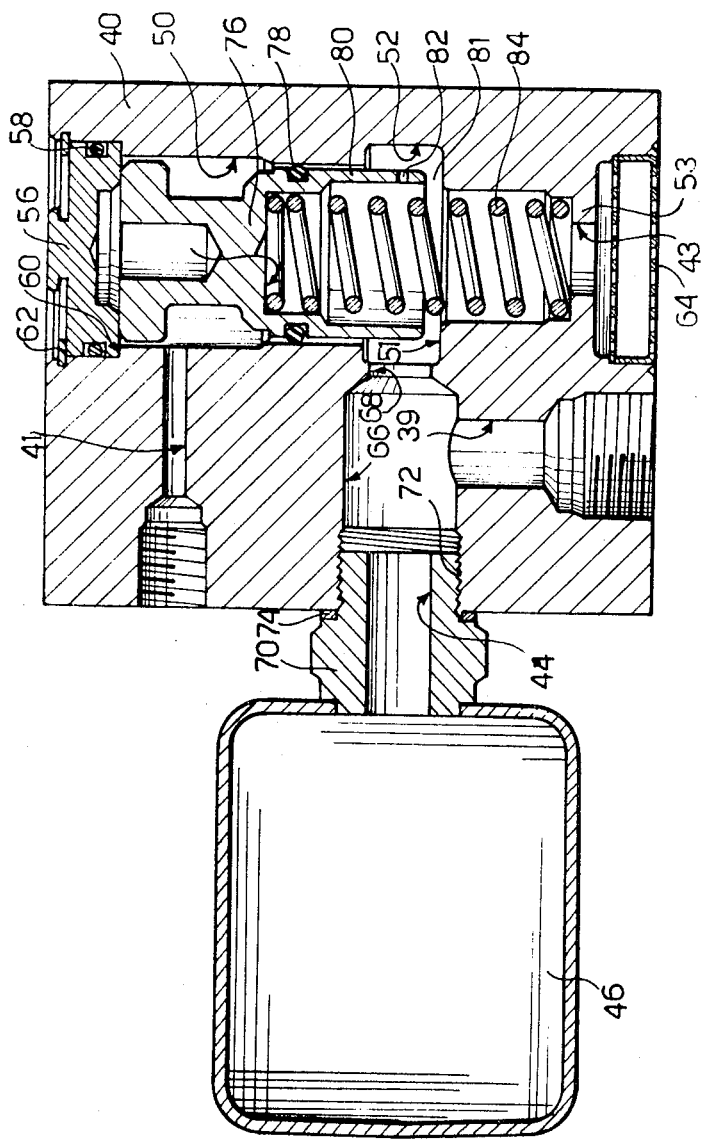

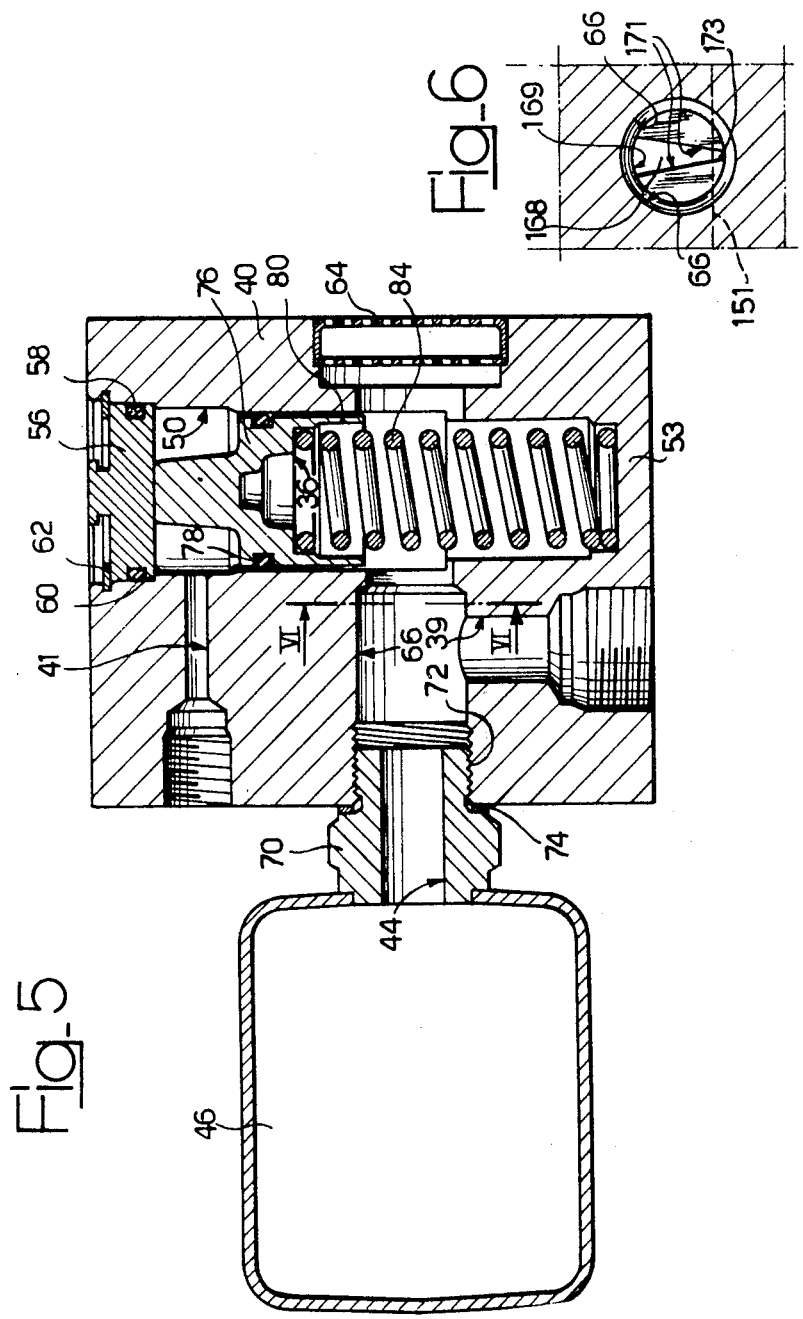

PNEUMATIC ANTI-SKID VEHICLE BRAKING SYSTEM, HAVING TWO MODES OF OPERATION

BACKGROUND OF THE INVENTION

The present invention relates to anti-skid braking systems for motor vehicles, and particularly to an improved anti-skid braking system which reacts differently when it receives a braking modulation signal from an anti-skid control device, in dependence on the amount of grip offered by the ground over which the vehicle is moving.

A fundamental problem of anti-skid braking systems is the difficulty of obtaining a satisfactory response from the system in different situations and in different road conditions. In particular, a response which will give satisfactory performance of the anti-skid system on substantially dry surfaces is often unsuitable on a very slippery surface such as an icy or muddy road. Similarly, if the response is set up to be suitable for slippery surfaces it is, in general, not suitable for substantially dry surfaces on which the grip of the tyres may be considerably better. In fact, the braking pressure required to cause a given rate of deceleration of the wheels of a vehicle will depend on the surface. It is well known that a relatively light braking pressure can cause locking of a vehicle's wheels on a slippery surface whereas considerably greater pressure is required to achieve the same effect on a dry surface. Thus, since the grip of the tyres on a slippery surface is low the braking pressure required to lock the wheels will be low and accordingly the release of pressure must be substantially complete in such a situation. On the other hand, if a high pressure is required before the anti-skid control system provides a pressure release signal the release of pressure should preferably only be partial to avoid any jerking or jolting due to a sudden change of deceleration which would, in itself, be deleterious to the road holding of the vehicle.

One suggestion for providing an anti-skid braking system having two modes of operation is described in U.S. Pat. application Ser. No. 195,867, filed Jan. 12, 1971. The system described in this application has two modes of operation which are suitable for braking on slippery surfaces and on dry surfaces, the choice between the two modes of operation being made automatically and based on a discrimination about a threshold value of the braking pressure at which the anti-skid device operates to modulate the braking pressure.

In the above mentioned previous patent application (to which attention is directed for a more complete description), there is described an anti-skid braking system which, whilst achieving the desired object, has several disadvantages most of which are due to the relative complexity of the system. In particular, the presence of a dump diaphragm valve involves, on one hand, a lag in the braking restarting phase, with consequent extension of the response time of the system, and on the other hand a reduction of the scope of application of the system, due to occasional blocking of the diaphragm.

Moreover, in this previous system, the driving pressure which determines the appropriate mode of operation is supplied from an operating cylinder through a non-return valve having a throttle, which has to be accurately calibrated and this increases the cost.

OBJECTS OF THE INVENTION

It is an object of the present invention, therefore, to provide a motor vehicle braking system having two modes of operation.

Another object of the invention is to provide a construction which is more compact than previously known devices, and which is, at the same time, more reliable and more economical.

SUMMARY OF THE INVENTION

According to the present invention there is provided an anti-skid braking system for at least one wheel of a vehicle, of the type comprising a source of pneumatic pressure, a brake cylinder connectable to the pressure source, pressure discharge means operable to release the braking pressure in the brake cylinder, and a device sensitive to the dynamic state of the wheel to actuate the pressure discharge means during braking in dependence on the dynamic state of the wheel, in which the pressure discharge means is sensitive to the braking pressure to allow a substantially complete release of the braking pressure at a high rate if actuated when the braking pressure is below a predetermined threshold value, and to allow only a partial release of pressure at a high rate if actuated when the braking pressure is above the predetermined threshold value, the discharge means operating, after the said partial release, to release the braking pressure at a controlled, reduced rate which increases as the braking pressure falls below the predetermined threshold value to allow a substantially complete release of the braking pressure.

Further features and advantages of the invention will become apparent in the following description with reference to the accompanying drawings which is given merely by way of non-restricting example.

BRIEF DESCRIPTION OF THE DRAWINGS

FIG. 1 is a diagrammatic view of an anti-skid braking system constructed in accordance with the invention;

FIGS. 2 and 3 are diagrams illustrating the variation of the braking pressure with respect to time for the two different modes of operation of the system in FIG. 1;

FIG. 4 is an axial section of one form of a valve suitable for use in the embodiments of FIG. 1;

FIG. 5 is a second form of the valve of FIG. 4 suitable for use in the embodiment of FIG. 1;

FIG. 6 is a partial section taken on the line VI—VI of FIG. 5; and

FIG. 7 is a diagram illustrating the variation of braking pressure with respect to time in one mode of operation of the system of FIG. 1 with the valve of FIG. 5.

DESCRIPTION OF THE PREFERRED EMBODIMENTS

In all the Figures, corresponding components are indicated with the same reference numerals.

In FIG. 1 there is shown a source of pneumatic pressure 10 which supplies pressure through a pipe 12 to a continuously variable distributor valve 14 which is normally closed and which is operated by a brake pedal 16. A pipe 18 connects the outlet of the distributor valve 14 to the inlet of a solenoid operated valve 20, of the three way and two position type. The solenoid operated valve 20 (which for convenience will hereinafter be referred to as an electrovalve) connects the pipe 18 to a pipe 24 when the solenoid is de-energised. The pipe 24 leads to a brake cylinder 26 which operates a brake 28 of a wheel 30 of a vehicle (not illustrated).

When the solenoid 22 is energised the electrovalve 20 is moved into a second position and closes the pipe 18, at the same time connecting the pipe 24 to an outlet 21.

The speed of the wheel 30 is detected by a tachometer 32, which may be for example, a dynamo tachometer. This, by means of a line 33, supplies a velocity signal to an antiskid device 34, which can be of any appropriate known type. For example, a very simple type of anti-skid device consists of an input from a tachometer and a bistable device (Schmitt trigger) with a cascade connection arranged to apply an output voltage to a line 36 when deceleration of the wheel 30 exceeds a predetermined threshold value, thereby indicating the imminent locking of the wheel. The voltage signal on the line 36 energises the solenoid 22 when the wheel is in a condition where locking is imminent as determined by the anti-skid device on the information from the signal of the tachometer 32. Energisation of the solenoid 22 causes the electrovalve 20 to move to the above mentioned second position.

A preferred anti-skid device 34 suitable for use in this system is described in U.S. Pat. application Ser. No. 103,092 filed Dec. 31, 1970.

To the outlet 21 of the electrovalve 20 there is connected a pipe 38 which leads to an inlet 33 of a valve 40 which is controlled by the pressure in a control port 41. The valve 40 is normally (that is, when the pressure in the control gate is below a certain threshold value) in a position where it couples the inlet 33 to an outlet 43 which is open to the atmosphere. Connected to the tube 38 near the valve 40 there is an expansion chamber 46 the function of which will be explained below.

The valve 40 also has a second outlet 44 to which is connected a throttle 48 which is open to the atmosphere. The valve operates to connect the inlet 33 to the outlet 44 when the pressure in the control port exceeds the above mentioned threshold value.

When the pedal 16 is operated upon braking, pressure is applied from the sources 10 to the brake 26 via the pipe 12, the distributor valve 14, the pipe 18, the electrovalve 20, and the pipe 24. The pressure in the brake cylinder 26 increases as shown by the line A-B of FIG. 2, or D-E of FIG. 3. If, due to this braking operation, the wheel 30 undergoes an excessive deceleration, such as to make locking imminent, this will be detected by the anti-skid device 34, which energises the solenoid 22 of the electrovalve 20 to close the pipe 18 and to form a connection between the pipe 24 and the pipe 38 via the outlet 21 of the valve 20. This position is shown at point B in FIG. 2 and point E in FIG. 3.

Depending on the braking pressure which has been exerted to cause the incipient locking of the wheel 30 the system will operate in one of two different modes. If the pressure is below the above-mentioned threshold value to which the valve 40 is sensitive (for convenience referred to hereinafter as the pressure Po) then the inlet 33 will be coupled to the outlet 43 and thence directly to the atmosphere, and a path will be formed from the cylinder 26 along the pipe 24, through the valve 20, along the pipe 38, and through the valve 40 to the atmosphere. The pressure in the brake cylinder 26 thus falls sharply as shown in FIG. 2, that is the pressure will fall sharply from the value at point B to atmospheric pressure at point C.

On the other hand, if the pressure in the brake cylinder is greater than $P_o$ the valve 40 will be in a position where the inlet 33 is connected to the outlet 44, and the pressure in the pipe 38 will be discharged through the outlet 44 to the throttle 48. Since the discharge through the throttle is slow with respect to the flow into the valve 40 the effect of the expansion chamber 46 becomes considerable. In fact the pressure in the brake cylinder 26 will first experience a sharp reduction down to the value F shown in FIG. 3 as the expansion chamber 46 fills and the pressure in the expansion chamber rises to that of the brake cylinder 26. After this point the pressure is discharged at a slower rate, as shown by the line F-G of FIG. 3, through the throttle 48 to the atmosphere. Finally, as the pressure in the cylinder 26, and hence in the pipe 42, falls below the value $P_o$, as shown at G in FIG. 3, the valve 40 will return to the state in which the inlet 33 is connected directly to the atmosphere via the outlet 43, and the pressure in the pipe 24, and thus the cylinder 26, will fall abruptly as shown by the line G-H, of FIG. 3, until it reaches atmospheric pressure.

Thus FIGS. 2 and 3 respectively show the variation of pressure in the brake cylinder 26 in the two different modes of operation of the system in cases in which the anti-skid device 34 does not provide any further signals, after the initial signal at the points B and E respectively of FIGS. 2 and 3. In practice, however, the variation of the braking pressure described above for the two modes of operation will be interrupted by a signal from the device 34 to the electrovalve 20 to initiate an increase of the braking pressure to re-apply the brakes. The point $t_o$, in the cycle of operation, at which this will occur depends on the state of the surface and the tyres, and also on the characteristics of the anti-skid device 34 and various other considerations such as the speed of the vehicle; therefore it is not possible to predict at exactly what point in the cycle the point $t_o$ will occur.

In FIG. 2 the point $t_o$ at which braking recommences, that is the point at which the electrovalve 20 is returned to its normal position, has been shown, by way of example, at a certain interval of time after the point C at which the braking pressure falls to atmospheric: the broken line I-J illustrates the subsequent increase of the braking pressure. The point $t_o$ could, however, be at any point after the point B depending on the particular braking situation obtaining at the time.

In FIG. 3 the point $t_o$ has been illustrated as being during the slow fall of braking pressure as the pressure is released through the throttle 48. In fact, if the device is correctly proportioned and calibrated, the point $t_o$ should normally be near to the point F, either slightly before or slightly after it. In a typical braking situation on a good surface the throttle 48 is not essential and the braking pressure, after the fall from E-F, could remain constant at the value of the point F until the recommencement of braking. The release of pressure shown at F-G-H is therefore by way of being a safety measure which ensures satisfactory anti-skid operation even in abnormal situations such as, for example, a braking operation started upon a good holding surface and finishing upon a poor holding surface: such a situation can occur if, for example, there is a sheet of ice on an otherwise dry road. In such a case the decrease of pressure illustrated in the section F-G-H ensures that the anti-skid action operates safely.

FIG. 4 shows one embodiment of the valve 40, including the expansion chamber 46 and the throttle 48.

The valve 40 of this embodiment comprises a casing having a cylindrical bore 50 in which there is formed an annular chamber 52 at an intermediate position along the length of the bore 50. At one end 53 of the bore 50 the outlet port 43 is formed, and a plug 56 closes the other end by cooperating with a sealing ring 58, abutting against a shoulder 60 formed in the casing by counterboring the cylindrical bore 50; a circlip 62 retains the plug 56 in place. The outlet port 43 communicates with the atmosphere via a filter 64.

An inlet port 39, for connection to the pipe 38 to form the inlet 33 of FIG. 1, leads to a chamber 66 which communicates through an opening 68 at one end with the above-mentioned annular chamber 58. The chamber 66 communicates at the other end with the expansion chamber 46 through a port 44 in a union 70 formed as part of the expansion chamber 46 and screwed in to a threaded portion 72 of the chamber 66. A sealing ring 74 is provided to make a pressure tight joint between the chamber 46 and the casing of the valve 40.

A control inlet 41 leads from the upper part of the cylindrical bore 50, and is arranged for connection to the pipe 42 of FIG. 1. A piston 76 having a relatively long skirt 80 slides in the cylindrical bore 50 and is sealed by a sealing ring 78. The skirt 80 of the piston has a calibrated aperture 82, which forms the throttle 48 of FIG. 1. A precompressed spring 84 extends between the base 86 of the piston 76 and the end 53 of the cylindrical bore 50.

The piston 76 is movable between a first position abutting the plug 56, and a second position with its skirt abutting against an end wall 51 of the annular chamber 52, under the action of the opposed forces exerted by the pressure on the piston 71 applied via the control inlet 41 and the spring 84. When the piston 76 is in the first position, there is an annular space 81 between its skirt 80 and the shoulder 51 which allows the annular chamber 52 to communicate freely with the outlet 43 and thus with the atmosphere. When the piston 76 is in the second position, the skirt 80 rests on the shoulder 51 so that there is no annular space and the only path to the atmosphere from the chamber 52 is via the throttle aperture 82.

The strength of the spring 84 determines the pressure in the control inlet 41 which is required to move the piston 76 from the first position to the second position: this pressure is, in effect, a threshold pressure since it is also the pressure below which the piston moves back to the first position. The movement of the piston 76 from one position to the other is a rapid transition without intermediate positions due to the precompression of the spring 84.

With the valve 40 and expansion chamber 46 of FIG. 4 in the hydraulic circuit of FIG. 1, the pressure which during braking reaches the control inlet 41 positions the piston 76 in either the first or second position depending on the braking pressure, which is an indication of the type of surface upon which the vehicle is travelling. When the braking pressure is released, either due to the operation of the anti-skid device 34, or because the driver releases the pedal 16, the pressure discharged by the electrovalve 20 into the inlet 33 (the chamber 39 of FIG. 4) passes into the chamber 66. If the piston 76 is in the first position the pressure discharges through the annular space 81 and the outlet port 43 to the atmosphere. If the piston 76 is in the second position with the skirt 80 abutting against the wall 51 and the annular space 81 closed, the pressure first discharges into the expansion chamber 46 until the pressure in the control inlet 41 and the pressure in the expansion chamber 46 are equalised, with a negligible flow through the throttle opening 82; the discharge then flows only through the throttle opening 82 to the atmosphere at a relatively slow rate; finally, when the pressure in the control inlet 41, which is connected to the pressure in the inlet chamber 39, has fallen below the above-mentioned threshold pressure determined by the spring 84, the piston 76 moves to the first position opening the annular space 81 and allowing the pressure in the chamber 66 to freely discharge into the atmosphere via the chamber 52 and the annular space 81. This sequence is shown in FIG. 3 by the curve E-F-G-H.

FIGS. 5 and 6 illustrate a second embodiment of the valve 40 with an expansion chamber 46 suitable for use in the pneumatic circuit in FIG. 1. The essential difference between this embodiment of the valve 40 and that shown in FIG. 4 is the absence of an annular chamber corresponding to the chamber 52 and in the different formation of the opening 68 (168 in FIG. 6) by means of which the chamber 66 communicates with the cylindrical bore 50, and in the arranging of the discharge opening 43, which is arranged radially with respect to the cylindrical bore 50 in the embodiment of FIG. 5 and axially in the embodiment of FIG. 4. Moreover, the skirt 80 of the piston 76 has no opening corresponding to the throttle opening 82 and the spring 84 is not precompressed, although it does have a gradual operation.

FIG. 6, which is a partial section along the line VI—VI of FIG. 5, illustrates the shape of the opening 168, which is an isosceles triangle having an arcuate base 169 and two sides 170 converging towards an apex 173. In this embodiment the pressure in the control inlet 41 compresses the spring 84 gradually as the pressure increases, and therefore the piston 76 can take up any intermediate position between an end position abutting the stopper 56 and an end position with the skirt 80 of the piston 76 abutting against a stop 151 (see FIG. 6) where the diameter of the annular bore 50 is reduced. The position of the lower edge of the skirt 80 in the extreme position of the piston 76 is shown as a broken line in FIG. 6, corresponding to the stop 151.

The throttling action of the passage 168 is thus infinitely variable between the two end positions and increases as the cross section of that part of the opening 168 which is left uncovered by the skirt 80 of the piston 76 decreases. This uncovered portion never reduces to nothing, because in the end position of the piston 76 when the skirt 80 abuts against the stop 151, there is still a small aperture at the apex 173 of the triangular opening 168 since the stop 151 is formed slightly displaced from the apex 173 of the opening 168.

With the valve 40 and expansion chamber of FIG. 5 in the pneumatic circuit of FIG. 1 the valve 40 will behave in the same way as the valve 40 of FIG. 4 when the braking pressure is so low that no appreciable movement of the piston 76 is caused: in such a case, in fact, the pressure in the passage 39 discharges freely to the atmosphere via the chamber 66, the opening 168 (which is fully open), the cylindrical bore 50, and the outlet port 43.

In the other extreme position, when the braking pressure is very high, the pressure in the control inlet 41 progressively forces the piston 76, the movement of which is controlled by the spring 84, along the bore 50 with the increase of braking pressure, until the edge of the skirt 80 of the piston 76 engages gently against the stop 151. If the anti-skid device now operates to release pressure in the brake cylinder 26, the initial discharge of pressure flows to the expansion chamber 46; discharge to the atmosphere then continues through the small aperture at the end 173 of the opening 168. The size of this opening increases gradually as the pressure decreases in the control inlet 41, which is connected to the passage 39, and as the piston 76 moves away from the stop 151 under the action of the spring 84.

The variation of pressure is shown in FIG. 7 where the increase of braking pressure is indicated by the line K-L, the initial decrease of pressure as the expansion chamber 46 is filled is indicated by the line L-M and the subsequent gradual discharge of pressure is indicated by the line M-N. The line M-N may be considered as a continuous version of the line F-G-H of FIG. 3 and it will be appreciated that the embodiment of FIG. 5 offers the advantage of a smoother operation, than the embodiment of FIG. 4 since there is a smooth transition between the two modes of operation.

It will also be appreciated that various different intermediate operational situations are possible depending on the amount of the passage 168 left initially uncovered by the skirt 80 of the piston 76 by the initial braking pressure.

We claim

1. In an anti-skid braking system for at least one wheel of a vehicle, of the type comprising a source of pneumatic pressure, a pressure operated brake means connecting said brake to said pressure source, pressure discharge means operating to release the braking pressure in said brake, and means sensitive to the dynamic state of said wheel and operating to actuate said pressure discharge means during braking in dependence on the dynamic state of said wheel, the improvement wherein, said pressure discharge means is sensitive to said braking pressure to allow a substanatially complete release, of said braking pressure at a high rate if actuated when said braking pressure is below a predetermined threshold value, said pressure discharge means allowing only a partial release of pressure at a high rate if it is actuated when said braking pressure is above said predetermined threshold value, and operating, after said partial release of braking pressure, to release, braking pressure at a controlled, reduced rate which increases as said braking pressure falls, due to said release, below said predetermined threshold value to allow a substantially complete release of said braking pressure said pressure discharge means including, a selector valve having a control port to which said braking pressure is applied, a braking pressure inlet, an outlet which freely communicates with the atmosphere, throttle means for reducing the free communication to the atmosphere, and an expansion chamber connected to said braking pressure inlet, said selector valve connecting said braking pressure inlet with said first outlet when said braking pressure at said control port is below said predetermined threshold value and changing to connect said braking pressure inlet to said second outlet if said braking pressure at said control port exceeds said threshold value.

2. The anti-skid braking system of claim 1 wherein said pressure discharge means further includes, a bore in said valve, said braking pressure inlet being connected to said bore, said throttling means comprising a piston slidable along said bore in said valve, a spring biasing said piston in one direction along said bore and said pressure in said control port biasing said piston in the other direction along said bore, said piston being movable between a first position to open said outlet from said bore if the force exerted by the pressure in said control port is less than that exerted by said spring and a second position to throttle said outlet from said bore if the force exerted by the pressure in said control port is greater than the force of said spring.

3. The anti-skid braking system of claim 2, wherein said bore has an annular enlargement communicating with said braking pressure inlet, said piston having a skirt with a throttle opening therein, said skirt of said piston and one face of said annular enlargement forming an annular passageway between said annular enlargement and said outlet, when, said piston is in said first position, and abutting to close said annular passageway when said piston is in said second position such that the only path to said outlet is through said throttle opening in said skirt of said piston.

4. The anti-skid braking system of claim 3, wherein said spring is pre-compressed.

5. The anti-skid braking system of claim 2, wherein said braking pressure inlet communicates with said bore by means of a triangular port with which said piston cooperates to control the flow from said braking pressure inlet into said bore, said port being positioned so that the area exposed by said piston varies inversely with the braking pressure in said control port.

6. The anti-skid braking system of claim 5 wherein said bore has a stop against which said piston abuts when in said second position, said stop being positioned so that said triangular port is not entirely covered by said piston when in its second position.

* * * * *